United States Patent
Chen et al.

(10) Patent No.: US 7,216,099 B2
(45) Date of Patent: May 8, 2007

(54) AUTOMATICALLY ALLOCATING AND REBALANCING DISCRETIONARY PORTFOLIOS

(75) Inventors: Peng Chen, Elmhurst, IL (US); Roger Ibbotson, Hamden, CT (US); Michael C. Henkel, Evanston, IL (US)

(73) Assignee: Ibbotson Associates, Chicago, IL (US)

( * ) Notice: Subject to any disclaimer, the term of this patent is extended or adjusted under 35 U.S.C. 154(b) by 556 days.

(21) Appl. No.: 10/091,046

(22) Filed: Mar. 5, 2002

(65) Prior Publication Data
US 2003/0172018 A1    Sep. 11, 2003

(51) Int. Cl.
G06Q 40/00    (2006.01)

(52) U.S. Cl. ..................... 705/36 R; 705/35

(58) Field of Classification Search ........... 705/36 R, 705/35
See application file for complete search history.

(56) References Cited

U.S. PATENT DOCUMENTS

| | | | |
|---|---|---|---|
| 5,148,365 | A | 9/1992 | Dembo |
| 5,806,047 | A | 9/1998 | Hackel et al. |
| 5,809,484 | A * | 9/1998 | Mottola et al. ........... 705/36 R |
| 5,812,987 | A | 9/1998 | Luskin et al. |
| 5,819,238 | A | 10/1998 | Fernholz |
| 5,911,136 | A | 6/1999 | Atkins |
| 5,918,217 | A | 6/1999 | Maggioncalda et al. |
| 5,999,917 | A | 12/1999 | Facciani et al. |
| 6,012,044 | A | 1/2000 | Maggioncalda et al. |
| 6,018,722 | A | 1/2000 | Ray et al. |
| 6,021,397 | A | 2/2000 | Jones et al. |
| 6,078,904 | A | 6/2000 | Rebane |
| 6,154,732 | A | 11/2000 | Tarbox |
| 6,205,434 | B1 | 3/2001 | Ryan et al. |
| 6,240,399 | B1 | 5/2001 | Frank et al. |
| 6,253,192 | B1 | 6/2001 | Corlett et al. |
| 6,292,787 | B1 | 9/2001 | Scott et al. |

(Continued)

FOREIGN PATENT DOCUMENTS

JP    2001-076057 A    3/2001

(Continued)

OTHER PUBLICATIONS

Web page: Efficient Solutions, Inc., http://www.effisols.com, believed posted at least as early as Mar. 2, 2001, copyr. 1998-2002.

(Continued)

*Primary Examiner*—Narayanswamy Subramanian
(74) *Attorney, Agent, or Firm*—DLA Piper US LLP; R. Blake Johnston

(57) ABSTRACT

An automated retirement plan manager manages the assets of an employee retirement benefits plan on behalf of an employer. The plan manager executes trades on investment vehicles based on instructions from an automated independent investment advisor. The advisor calculates a human capital for each plan participant based on data derived from the employer and from the participant through an interface, and based on that human capital calculation recommends an allocation of portfolio assets to the participant. This recommendation, once presented for review by and perhaps modified by the participant, becomes an instruction to the plan manager. As the participant ages his or her human capital is recalculated, and this is used to determine whether the participant's present portfolio type should now be switched to a more conservative one.

12 Claims, 7 Drawing Sheets

U.S. PATENT DOCUMENTS

| | | |
|---|---|---|
| 6,405,179 B1 | 6/2002 | Rebane |
| 6,430,542 B1 | 8/2002 | Moran |
| 6,484,151 B1 | 11/2002 | O'Shaughnessy |
| 6,484,152 B1 | 11/2002 | Robinson |
| 6,601,044 B1 | 7/2003 | Wallman |
| 2002/0013751 A1 | 1/2002 | Facciani et al. |
| 2002/0013754 A1 | 1/2002 | Frank et al. |
| 2002/0038271 A1 | 3/2002 | Friend et al. |
| 2002/0052819 A1* | 5/2002 | Burton ............... 705/36 |
| 2002/0059127 A1 | 5/2002 | Brown et al. |
| 2002/0062272 A1 | 5/2002 | Kim et al. |
| 2002/0091605 A1 | 7/2002 | Labe, Jr.et al. |
| 2002/0103733 A1 | 8/2002 | Barrington et al. |
| 2002/0107770 A1 | 8/2002 | Meyer et al. |
| 2002/0123951 A1 | 9/2002 | Olsen et al. |
| 2002/0128941 A1 | 9/2002 | Champion et al. |
| 2002/0138381 A1 | 9/2002 | Tomecek |
| 2002/0138383 A1 | 9/2002 | Rhee |
| 2002/0138388 A1 | 9/2002 | Reiss |
| 2002/0138389 A1 | 9/2002 | Martone et al. |
| 2002/0152151 A1 | 10/2002 | Baughman et al. |
| 2002/0156710 A1 | 10/2002 | Ryder |
| 2002/0169701 A1 | 11/2002 | Tarbox et al. |
| 2002/0174042 A1 | 11/2002 | Arena et al. |
| 2002/0174045 A1 | 11/2002 | Arena et al. |
| 2002/0174047 A1 | 11/2002 | Fernholz |
| 2002/0184129 A1 | 12/2002 | Arena et al. |
| 2003/0014343 A1 | 1/2003 | Jones |
| 2003/0028466 A1 | 2/2003 | Jenson et al. |
| 2003/0065602 A1 | 4/2003 | Yip |
| 2003/0088492 A1 | 5/2003 | Damschroder |
| 2003/0093347 A1 | 5/2003 | Gray |
| 2003/0110113 A1 | 6/2003 | Martin |
| 2003/0120574 A1 | 6/2003 | Wallman |
| 2003/0120575 A1 | 6/2003 | Wallman |
| 2003/0120576 A1 | 6/2003 | Duckworth |
| 2003/0126054 A1 | 7/2003 | Purcell, Jr. |
| 2003/0144936 A1 | 7/2003 | Sloan et al. |
| 2003/0208429 A1 | 11/2003 | Bennett |
| 2003/0212622 A1 | 11/2003 | Wallman |
| 2006/0080199 A1* | 4/2006 | Tarbox et al. ............... 706/35 |
| 2006/0089895 A1* | 4/2006 | Joye et al. ............... 705/35 |
| 2003/0208427 A1 | 11/2006 | Peters et al. |

FOREIGN PATENT DOCUMENTS

JP      2004185509 A   *   7/2004

OTHER PUBLICATIONS

Delaney and Reichenstein, "An Expanded Portfolio View Includes Real Estate and Human Capital", AAII Journal (Jul. 1996), pp. 7-11.

Hanna and Chen, "Subjective and Objective Risk Tolerance: Implications For Optimal Portfolios", Financial Counseling and investing, vol. 8(2), pp. 17-26 (1997).

Web page: ITS Associates, Inc.—Products, http://www.itsww.com/products, last updated Feb. 26, 2002, copyr. 1999.

Web page: ITS Associates, Inc., —Ouery2Trader, http://www.itsww.com/products/trader.htm, last updated Apr. 3, 2000, copyr. 1999.

Web page: Horace Mann Educators Corporation, "Rebalancing keeps your portfolio in sync", http://www.horacemann.com/html/annuity/rebalance. html, copyr. 2002.

Web page: Advisor Software, Inc., "Advisor Software: Solutions—Portfolio Rebalancing Solution", www.advisorsoftware.com/solutions/portfolio_rebalancing.html.copyr. 2003.

Web page: Strategic Financial Solutions, LLC., "PerTrac 2000 Software: Asset Allocation", http://www.pertrac2000.com/allocation.asp, copyr. 2002.

Web page: Strategic Financial Solutions, LLC, "PerTrac 2000: Portfolio Optimization",http://www.pertrac2000.com/optimization.asp, copyr.2001.

* cited by examiner

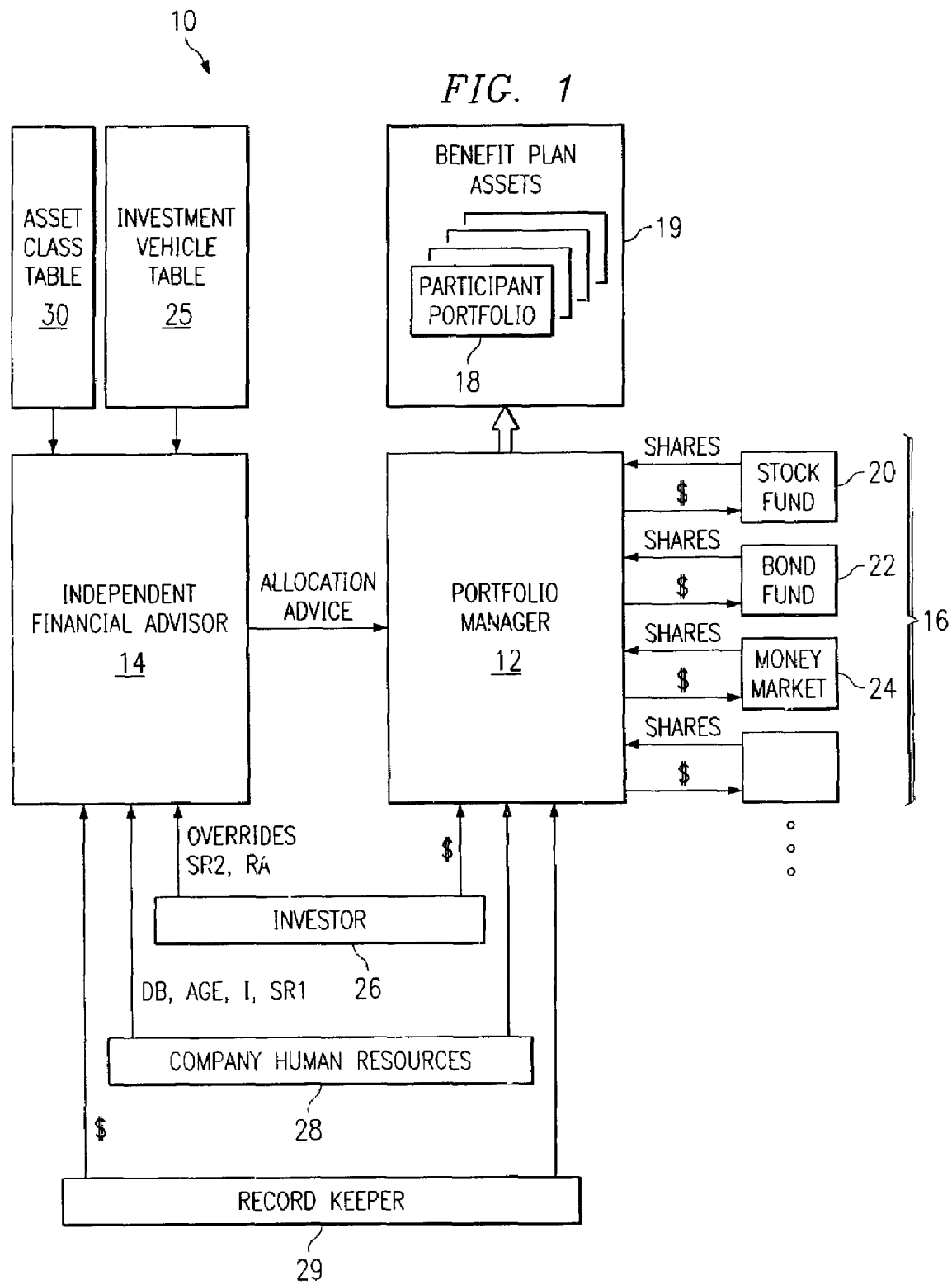

TO FIG. 2b AND FIG. 2b-1

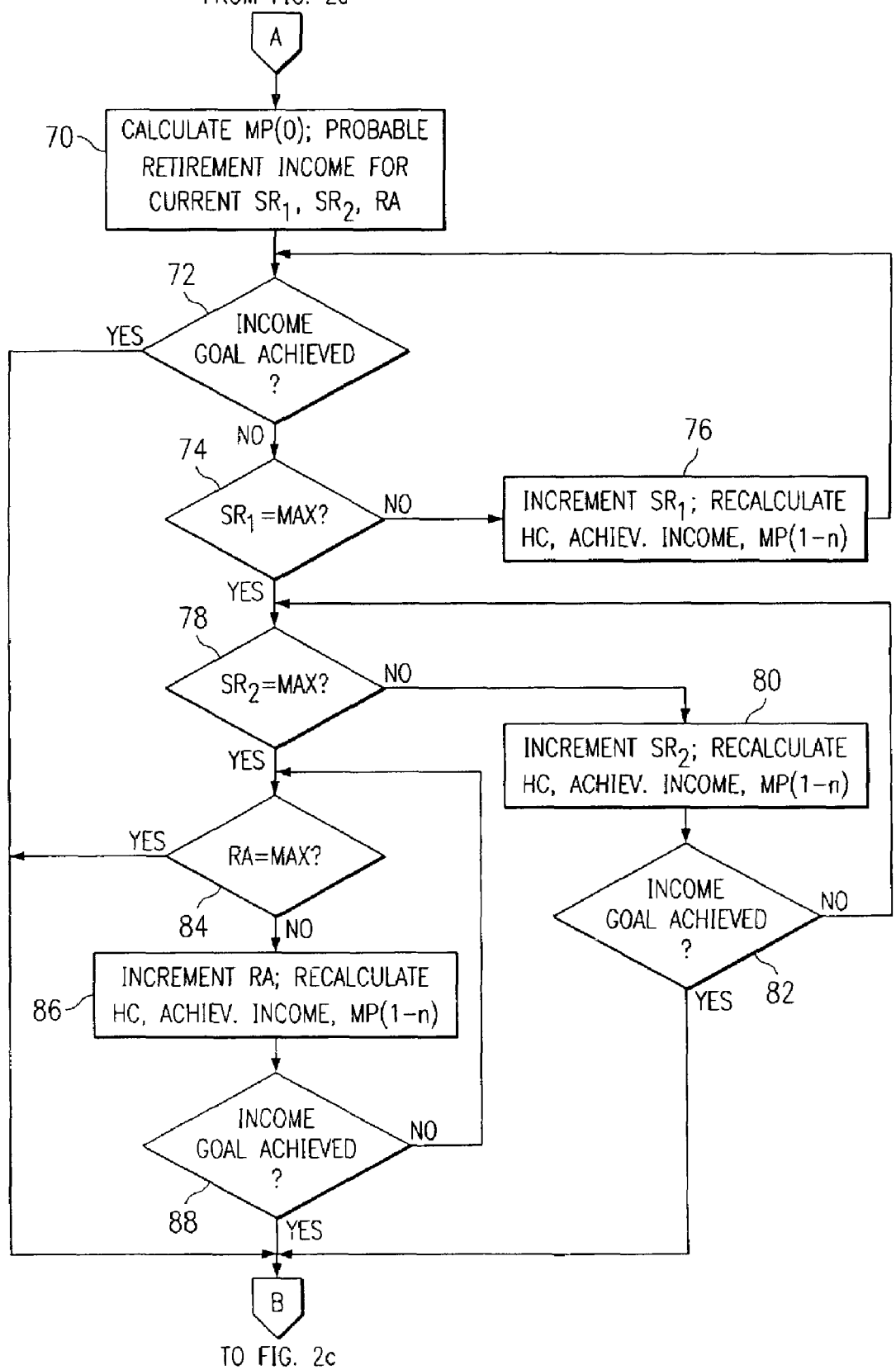

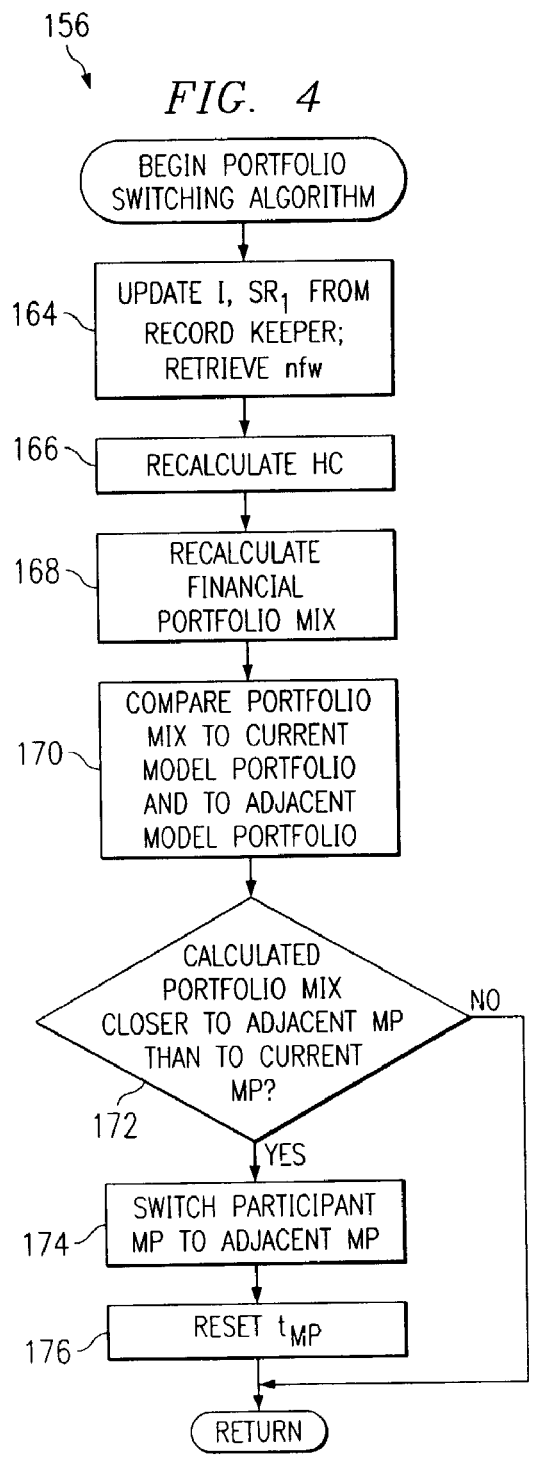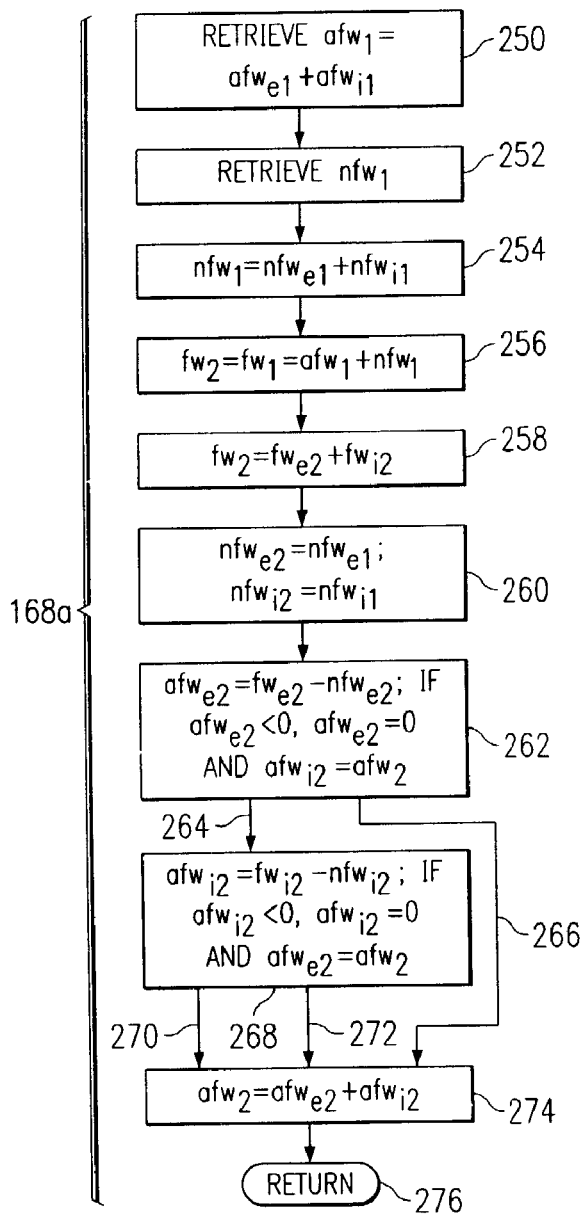

AUTOMATICALLY ALLOCATING AND REBALANCING DISCRETIONARY PORTFOLIOS

TECHNICAL FIELD OF THE INVENTION

The present invention relates in general to investment portfolio management, and more particularly to automatically allocating and rebalancing portfolios based on the age, financial condition and other attributes of an investor, as well as the future market performance of his/her portfolio.

BACKGROUND OF THE INVENTION

It is widely understood that workers should save a portion of their earnings to fund their retirement and other long-term goals, and invest these savings in a prudent manner so as to balance risk and return. Many employers have established benefit plans by which this may be accomplished, such as 401(k) retirement accounts and defined contribution pension plans.

It is common practice for employees to initially set up these plans to invest different percentages of the employee's contribution to different assets, such as different mutual funds, having differing degrees of risk and different rates of expected return. The worker is almost always given the discretion to change the percentage allocations made to various assets, and account managers usually even maintain a web site for this purpose, but empirical studies (e.g. "How Do Household Portfolio Shares Vary with Age?" Columbia University working paper, (2001) by John Ameriks and Stephen P. Zeldes) suggest that only a small minority, on the order of twenty percent, of all such workers actually make any alterations. The majority of all workers keep the initial allocations, and do not change them even in view of significant changes in their age, economic condition or need. As a result, what may have been a prudent allocation at the beginning begins to depart from the allocations which are optimum in view of advancing age, improving or deteriorating economic condition, newly available investment vehicles, or alterations in the performance characteristics of the assets that had been initially selected.

Recently, a concept called "Human Capital" has been used in computing what an investor should do given his or her present situation and age. Human Capital can be simply defined as the present value of future labor income or the actuarial present value of future savings directed toward retirement saving in the contexts of retirement portfolio management. The variables important to the calculation of Human Capital include future labor income, the amount of retirement savings in qualified retirement vehicles (such as 401(k) and IRA plans) and nonqualified retirement vehicles (such as taxable accounts and variable annuities), current age, retirement age, mortality and life expectancy, gender, real long-term interest rate, defined benefit pension income if any and social security income. The impacts of Human Capital on investor's portfolio choices have been studies in "Labor Supply Flexibility and Portfolio Choice in a Life Cycle Model," *Journal of Economic Dynamics and Control*, Vol. 16, 427–449 (1992); "Why Should Older People Invest Less in Stocks than Younger People?" *Federal Reserve Bank of Minneapolis Quarterly Review*, 20(3), 11–23 (1996); "An Expanded Portfolio View Includes Real Estate and Human Capital", *American Association of Individual Investors Journal*, 7–11 (July 1996), by Charles Delaney and William Reichenstein; "Subjective And Objective Risk Tolerance; Implications For Optimal Portfolios," *Financial Counseling and Planning*, Vol. 8, (1997) by Sherman Hanna and Peng Chen; "Optimal Portfolio Choice for Long-Horizon Investors with Nontradable Labor Income," Working Paper: Harvard University (1998) by Luis Viceira; and "Investing Retirement Wealth: A Life Cycle Model," *NBER* Working Paper Number 7029 (1999).

Although the impact of Human Capital on investor portfolio choices have been studied by many academics, this concept has not been used in the management of retirement plans or to automatically switch allocations of assets in the portfolio of an investor or plan participant.

SUMMARY OF THE INVENTION

The invention provides systems, methods and computer program products for the automated allocation and reallocation of assets in each of a plurality of investor portfolios. These investors may, for example, be participants in an employer's defined contribution retirement plan. According to one aspect of an invention, an automated plan manager allocates assets to each of a plurality of plan participant portfolios according to optimum portfolio choices made in view of the human capital of the participant. The plan manager makes investments among several investment vehicles for the participant according to investment advice transmitted to it by an automated, independent financial expert or advisor.

In one embodiment, the independent financial expert in turn retrieves data about each participant from the company or institution employing the participant or one or more other record keepers holding the requisite information about the participant, and retrieves other data from the participant himself or herself. As a first step and using these data, the independent financial expert calculates a present value of the human capital of the participant. It allocates the human capital among predetermined investment vehicle types to take into account the overall risk/return character of the earnings of a participant's likely work life. In a preferred embodiment, the human capital of the investor is treated as a 70% fixed income, 30% equity investment.

The total human capital of the investor is summed with the present financial assets of the investor to obtain a total present worth of an overall "portfolio". The algorithm uses a predetermined, optimum distribution of assets among investment vehicle or asset class types for this overall portfolio; in a preferred embodiment, this allocation is 42% equity and 58% fixed income. Then, by subtracting the human capital components from the total present worth, an allocation of the financial wealth assets of the investor is determined. This allocation typically will be more strongly skewed toward the equity side, than the allocation of the human capital, such that the sum of the human capital and the financial wealth components of the overall portfolio result in, or come as close as possible to, the optimum allocation.

According to another aspect of the invention, an automated, independent financial consultant or advisor uses an algorithm to formulate advice concerning the holdings of the portfolio of each of a plurality of plan participants. Absent a contrary indication from the participant, this advice is used to direct an automated plan manager to make investments for the portfolio in certain predetermined investment vehicles according to the advice from the independent financial consultant. Preferably, this algorithm is used periodically to reallocate portfolio assets to conform to an optimum model.

In another aspect of the invention, the algorithm includes a calculation of the human capital of the plan participant, and a recalculation of the human capital of the plan participant at a later time. The human capital component of a participant's overall present worth typically decreases over time. Since the human capital component of this worth is by nature a conservative investment, in order to have an overall "portfolio" of the same balance among assets of varying risk and return, a remaining, financial component of the net worth has to be shifted from assets which are more risky but which may give a greater return to assets which are safer.

In still another aspect of the invention, a method, system and computer-readable medium are provided for determining at least one savings rate and a retirement age of a plan participant. A system according to this aspect of the invention receives data concerning the current financial wealth of the plan participant, and automatically allocates portions of that current financial wealth to one or more asset classes based on the characteristics of the investment vehicles making up the financial wealth of the participant. The system further receives at least one currently existing and a first assumed retirement age. This system calculates a first case for a probably retirement income using the current financial wealth of the participant as assigned to the asset classes, the currently extant savings rate and the first assumed retirement age. The system calculates additional cases of probable retirement income by varying at least one of the savings rates and the retirement age. The participant selects one of these cases. The system then makes investments in the plan for the investor using the selected savings rate. This method also has application for investors who are not plan participants.

A principal technical advantage of the invention is that through the automated independent financial consultant, and especially where the plan is set up such that the "default" condition is to have the independent financial consultant make investment decisions on the portfolio rather than the plan participant, the assets of a retirement portfolio can be given an optimum allocation. Further, the portfolio no longer requires the active participation of the participant to reallocate assets to take into account the advancing age and/or changing economic condition of the participant. The independent financial consultant periodically rebalances the portfolio given the characteristics of the participant in a way which removes any conflict of interest between the role of the financial adviser, who recommends the contents of participant portfolios, and the role of a plan manager, who buys and sells these assets.

The present invention also has application to the management of taxable investor portfolios, i.e., the assets of an investor that are not in one or more nontaxable retirement plans.

BRIEF DESCRIPTION OF THE DRAWINGS

Further aspects of the invention may be discerned in the following Detailed Description when read in conjunction with the Drawings, in which like characters denote like parts and in which:

FIG. 2b-1 is a variant of FIG. 2b showing an alternative generation of retirement replacement income scenarios;

FIG. 4 is a flow diagram showing a portfolio switching algorithm which takes into account the change over time of a plan participant's human capital;

FIG. 4a is a detail of a variant of step 168 in FIG. 4, showing reallocation of assets given the presence of other, nonallocatable assets;

DETAILED DESCRIPTION OF ILLUSTRATED EMBODIMENTS

Figure 2A:
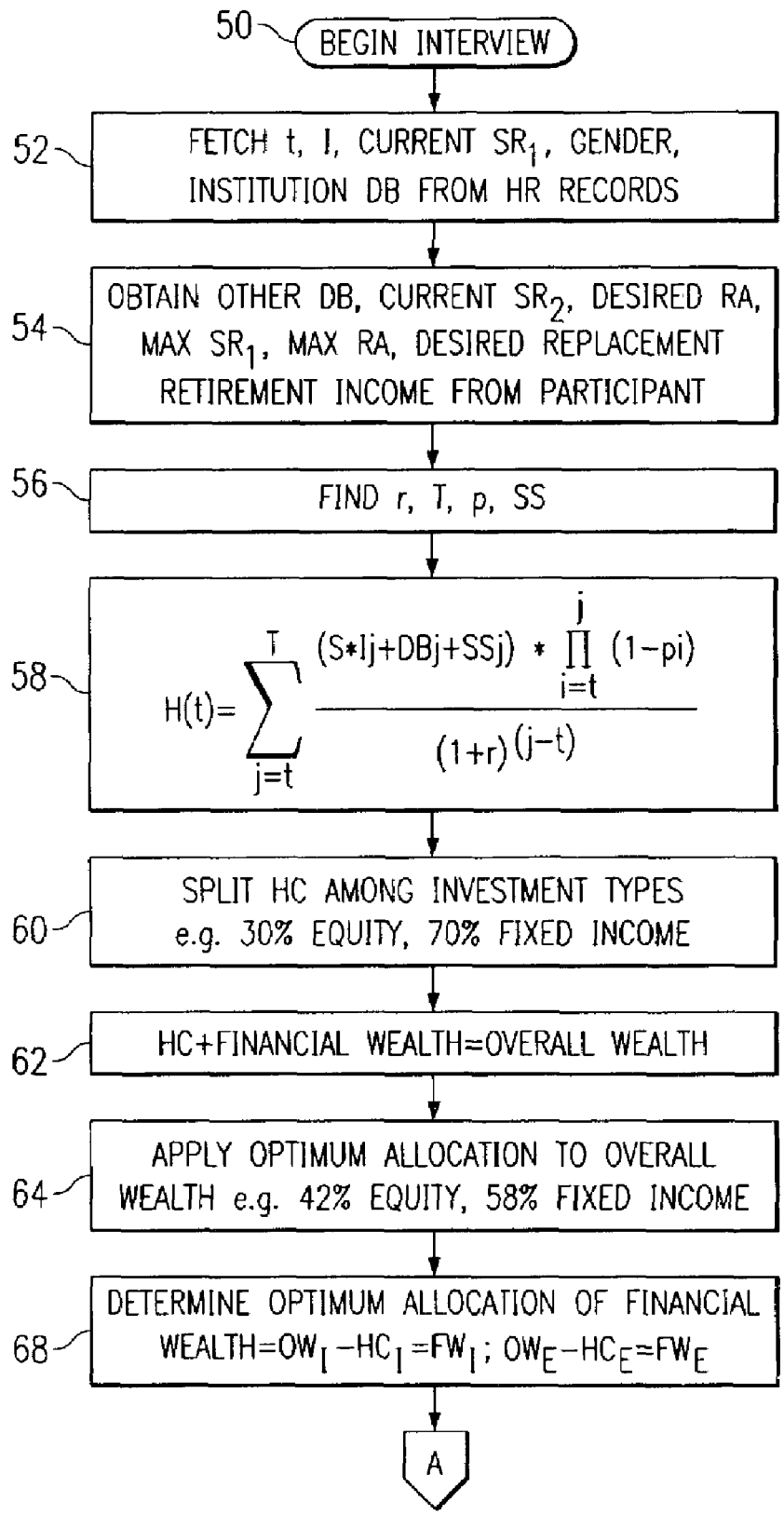
FIGS. 2a–2c constitute a flow diagram showing operation of automated independent financial advisor software according to the invention, resulting in an initial allocation among mutual funds for a plan participant.
Figures 1, 2B:
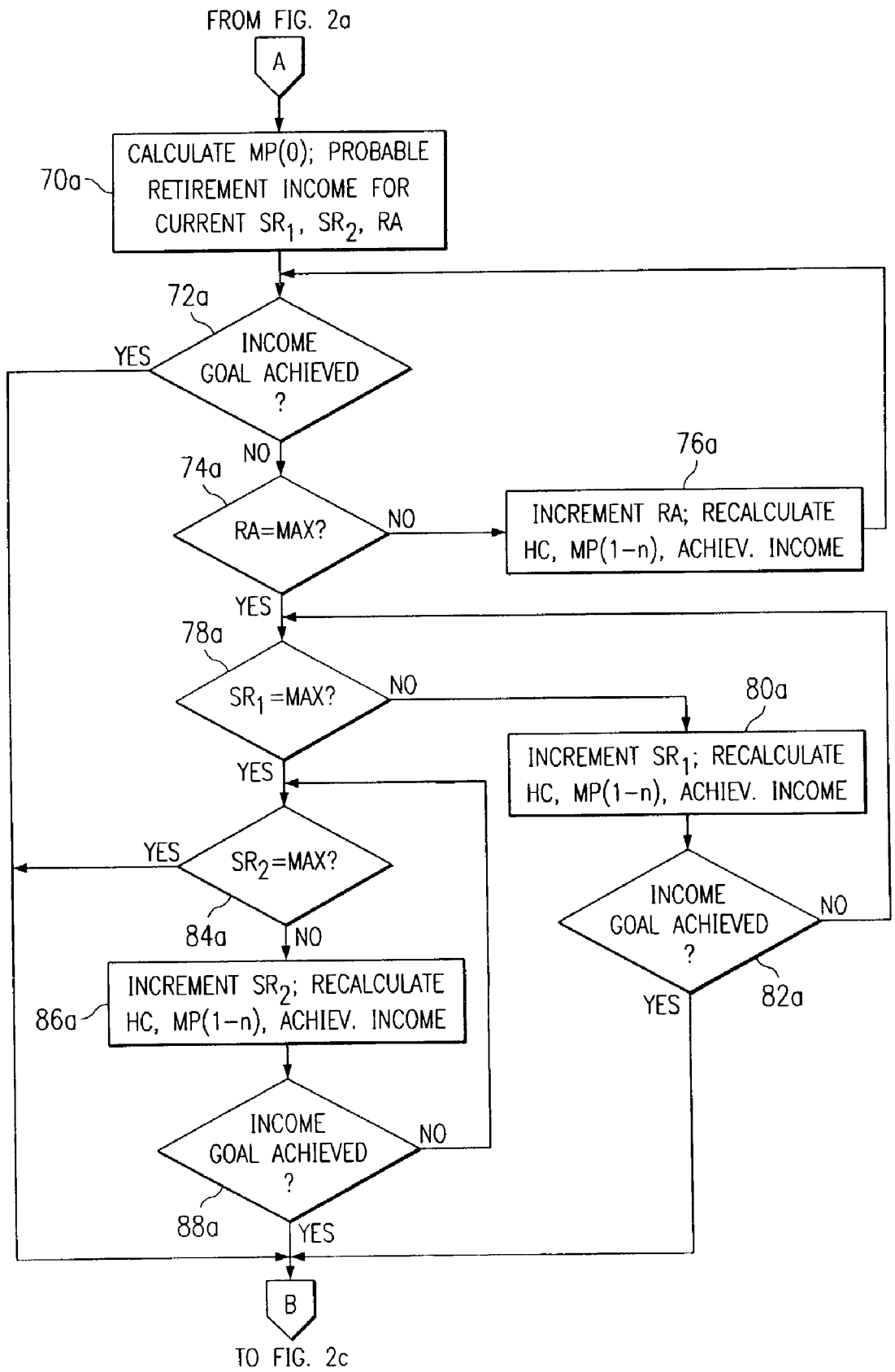
FIG. 1 is a block diagram of a benefit plan management system according to the invention.

Referring first to FIG. 1, a benefit plan management system indicated generally at 10 includes, as its basic components, an automated portfolio manager 12 and an automated independent financial advisor or consultant 14. To avoid conflicts of interest these two components are preferably owned and operated by different entities. The portfolio manager 12 invests funds given to it by or on behalf of a number of participants, which will typically consist of some or all of the employees of a company, trade union or institution. The portfolio or plan manager makes investments of its commingled participant funds in a number of investment vehicles 16 according to the needs of the participant portfolios 18 which it manages. There is established a separate portfolio 18 for each participant in the plan, and this portfolio 18 is instantiated as a separate database record for that participant. The sum of the portfolios 18 make up the benefit plan assets 19.

Each portfolio 18 will have in it an amount of assets which has been divided among the investment vehicles 16. The investment vehicles 16 have intentionally different degrees of risk and return and may include, for example, a stock mutual fund 20, a bond mutual find 22 and a money market fund 24. A larger array of funds can be used, such as might include a large capitalization stock fund, a small capitalization stock fund which will be riskier but offer greater potential return than the "large cap" find, and international funds. The number and identity of the investment vehicles 16 is set by an investment vehicle table 25, as will be later explained.

The way in which the assets of any particular portfolio 18 are divided among the permitted investment vehicles 16 is determined by advice (instructions) from the preferably automated independent financial advisor 14 and these instructions may in turn incorporate directions or overrides from the individual participant or investor 26 of that portfolio 18.

The independent financial advisor 14 (a) advises the participant 26 of the level of retirement savings the participant has to make in order to probably achieve a desired level of replacement retirement income starting at a given retirement age, (b) makes recommendations as to the contents of a participant's portfolio 18 given the age, income and savings characteristics of the participant, and (c) directs the plan manager 12 to make investments as the advisor 14 and the participant 26 determine. In order to render this advice, the advisor 14 needs employee data from e.g. the human resources department 28 of the participant's employer, and certain additional data which may be submitted by the participant or investor 26. A record keeper 29 distinct from either the HR department 28 or the investor 26 may supply some or all of the needed information. The data from the human resources department 28 or record keeper 29 will typically include the date of birth of the participant, the participant's gender, the present salary of the participant, and the present level of contribution of that salary to the plan by or on behalf of the participant. Certain other data are obtained from the participant either directly through a paper form or an online interview process, or indirectly through the HR department 28 or from record keeper 29: these data include the taxable savings rate of the participant, the amount and characteristics of financial assets of the participant other than those managed by the portfolio manager 12, and a retirement age if different from a default (such as age 65). The data may also include more detailed information concerning participant periodic cash flows, which for example are predicted to be less because certain other financial obligations (mortgage payments, college tuition) must be met, but which may be more when those financial obligations are discharged. These variances in cash flow might cause a variance in savings rates.

In making its calculations and recommendations, the financial advisor module 14 refers to an investment vehicle table 25 and an asset class table 30, which in actual practice may be combined. The investment vehicle table is a two-dimensional table which has a number of predetermined investment vehicles (typically, mutual finds of different kinds) along one dimension and a number of portfolio types along a second dimension. The portfolio types differ from each other in the relative amount of funds invested in each of the investment vehicles, and in the overall degree of risk that the investment vehicle mix represents. A more conservative portfolio type will be more heavily weighted in favor of fixed-income investment vehicles, while a more aggressive portfolio type will be more heavily weighted in favor of equity investments. In one embodiment there are provided seven portfolio types and ten different mutual funds; for each portfolio type the portfolio will index a percentage allocation to each of the mutual funds. On a periodic basis, such as yearly, this investment vehicle table will be replaced by an analyst to (1) substitute new mutual funds for others now in the table because of historic or predicted performance and (2) take into account any adjustment of an overall asset allocation target. For example, the analyst may decide that the overall asset allocation target should be 40% equity/60% fixed income instead of 42% equity/58% fixed income. After human capital is taken into account (discussed below) this may drive a reallocation of mutual funds in any particular portfolio type.

The asset class table 30 is a table of portfolio type versus asset class. The portfolio types will be the same as that for the investment vehicle table. Each portfolio type will have a percentage allocated to each of several of the asset classes, and this percentage changes from one portfolio type to another. In one embodiment there are five asset classes: money market, bond, large cap equity, small cap equity and international. The ten preselected mutual funds in table 25 are mapped on these asset classes according to their individual characteristics; some funds may bridge two or more asset classes and will be apportioned between them in a predetermined manner. The asset class table is used in determining optimum model portfolios for a participant once his or her human capital is taken into account.

The first major function of the independent financial advisor 14 is to help the plan participants decide at what rate they should invest and what investment mix they should be investing in. This is preferably done through an interview process which is diagramed in FIGS. 2a–2c, with one variant thereof being shown in FIG. 2b-1. In a particularly preferred embodiment the interview is conducted on-line through a web site (see FIG. 5), but the interview could alternatively be conducted using paper forms and/or with the aid of the human resources department 29 of the employer.

The interview is initiated at 50. Certain data concerning the participant will already be known to the employer (or record keeper 29) and these are fetched at step 52: the current date (t), the current tax-deductible savings rate ($SR_1$), or at least that component of it that is made up by the participant's participation in the plan, the salary (I), the gender of the participant (needed to determine mortality and life expectancy), and any defined benefit (DB) which will be payable by the employer to the participant upon retirement.

Other information is obtained from the participant at step 54. These other data include any component of the defined benefit income (DB) which will be available from any source other than the current employer; the participant's current taxable savings rate $SR_2$; any additional component of the participant's current tax-deductible savings rate $SR_1$; a desired retirement age RA, for which a default may be preset or upon which limitations may be placed by the employer; sources and types of financial wealth other than that component being managed by the employer in the plan; the initial replacement retirement income goal; the maximum tax-deductible savings rate $SR_1$ and taxable savings rate $SR_2$ which the participant can tolerate; and the maximum permissible retirement age.

Other data are obtained at step 56 by the independent financial advisor 14 from other tables or are derived. These include a vector of mortality rates ρ for each remaining year of the participant's life, the life expectancy T, the assumed discount rate r, and the predicted social security income SS earned by the participant.

At step 58, the advisor 14 calculates the value of human capital HC of the participant. One example of the calculation could use the following formula:

$$\text{Human Capital}(t) = \sum_{j=t}^{T} \frac{(S \times I_j + DB_j + SS_j) \times \prod_{i=t}^{j}(1-\rho_i)}{(1+r)^{(j-t)}}$$

where t=present age of the participant $I_j$=real salary for year j. In one embodiment the real salary is assumed to be constant until retirement. In more sophisticated applications $I_j$ can be allowed to vary in real terms through the participant's work life.

r=Real discount rate. In one embodiment the real interest rate on government bonds is used as the discount rate.

T=life expectancy for the participant.

$\rho_i$=mortality rate of the participant at age i.

S=savings rate, being the sum of the tax-deductible savings rate $SR_1$ and the taxable savings rate $SR_2$ $DB_j$=Defined Benefit Pension Income for year j.

$SS_j$=Social Security income for year j.

Alternatively, the human capital can be calculated according to the new formula below:

$$\text{Human Capital}(t) = \sum_{j=t}^{T} \frac{(I_j + DB_j + SS_j) \times \prod_{i=t}^{j}(1-\rho_i)}{(1+r)^{(j-t)}}$$

where t=present age of the participant
$I_j$=real salary for year j.
r=Real discount rate.
T=the end age of the mortality table.
$\rho_i$=mortality rate of the participant at age i.
$DB_j$=Defined Benefit Pension Income for year j.
$SS_j$=Social Security income for year j.

Once the human capital (HC) of a participant has been calculated, at step 60 it is divided into different investment types or asset classes in order to determine what the overall assets of the participant presently are. Human capital is treated as if it were much like a fixed income investment. HC does not fluctuate widely and has characteristics similar to those of a bond, such as a relatively fixed schedule of cash throughout a participant's life. But human capital has more "default risk" than a government bond: the participant could lose his or her job, become disabled, or have to accept work at a lower salary. Because of this nonzero default risk, the human capital component is treated as a distribution among at least two asset or investment types such as equity and fixed income, with the bulk of it being attributed to the more conservative asset type(s). In the illustrated embodiment, the human capital is allocated, 30%/70%, to equity and fixed income asset types. In a more sophisticated treatment, the human capital split may depend more on a participant's specific circumstances; for example, a tenured college professor will have a fixed income weight to his or her human capital that is much higher than the 70% given. An advanced or more complex system would determine the HC split according to demographic and personal information inputs or estimate the risk, return and other characteristics of HC separate from those financial assets. (E.g., HC could be modeled as a separate distinct asset, instead of a combination of the financial assets).

At step 62, the present worth of a participant's overall wealth is calculated by summing his or her total financial wealth (savings, investments) and the total human capital. This overall wealth (ow) is allocated, at step 64, to the same investment types used for allocation of HC. At step 68, an equity component of financial wealth fw(e) is derived by subtracting the equity component of human capital (HC(e)) from the equity component of the overall wealth ow(e). Similarly, a fixed income component of financial wealth, fw(i), is derived by subtracting the human capital fixed income component HC(i) from the fixed income component of the overall wealth, ow(i). These calculations derive an optimum allocation of a give a guide for equity/fixed income allocations for future investments. It is possible that the investor's human capital dominates his or her overall wealth, such that there is an insufficient amount of the investor's present financial wealth to shift the equity/income percentage back to optimum. If this is the case, the algorithm comes as close to optimum as it can, as by pinning financial wealth to 100% equity. An advanced or more complex embodiment would determine a participant's present financial wealth allocation through matching not only the equity/fixed income weights, but also the risk, return and other characteristics of the sum of financial wealth portfolio and human capital to the optimal allocation of overall wealth.

The illustration of the interview process continues in FIG. 2b. A beginning "model portfolio" (MP(0)) distributed among selected ones of the several available investment vehicles is derived at step 70, using the broader equity/fixed income financial wealth allocations determined at step 68. A mapping system is used to classify actual investments into broad asset classes. For each actual investment, the weight of each asset class is estimated. For example, one mutual find could be considered to consist of 75% in large cap stocks, 10% in international, and 15% in cash. These weights are estimated using return and/or actual holding data of the fund.

The system then performs a series of iterations to arrive at the participant's optimum savings rate and retirement age given a retirement replacement income goal. At step 72 the algorithm queries whether this goal has already been met given the initial assumptions for the model portfolio MP(0). If so, the process branches to connector 2c. If not, then at decision step 74 the process asks if the tax-deductible savings rate $SR_1$ (such as investments made into an available 401(k) account) are already at maximum. If not, at step 76 the process will increment $SR_1$ and recalculate HC. the optimum allocations of the participant's financial wealth and future investments, a further model portfolio MP(i), and a new achievable income that can be obtained at a certain probability, such as 67%, is calculated. The process then returns to step 72, and these calculations repeat until $SR_1$ is maximized or the income goal is reached.

At step 78, assuming the retirement income goal has not yet been achieved, the system asks whether the taxable savings rate $SR_2$ is at maximum. If not, the process increments $SR_2$ at step 80, and recalculates HC, a new model portfolio MP(n), and probable achievable retirement replacement income. The process will again query, at step 82, whether the retirement income goal has been reached; if so the iterations will terminate and if not the process will return to step 78.

At step 84 the process asks whether the retirement age RA is at a maximum limit. If so, the process proceeds to connector 2c; if not, then at step 86 RA is incremented, and HC, a new model portfolio MP(n) and probable achievable income are recalculated. At step 88 the algorithm again asks whether the retirement income goal has been achieved. If this is the case, the process returns to step 84, else the process continues to connector 2c.

Figure 2C:
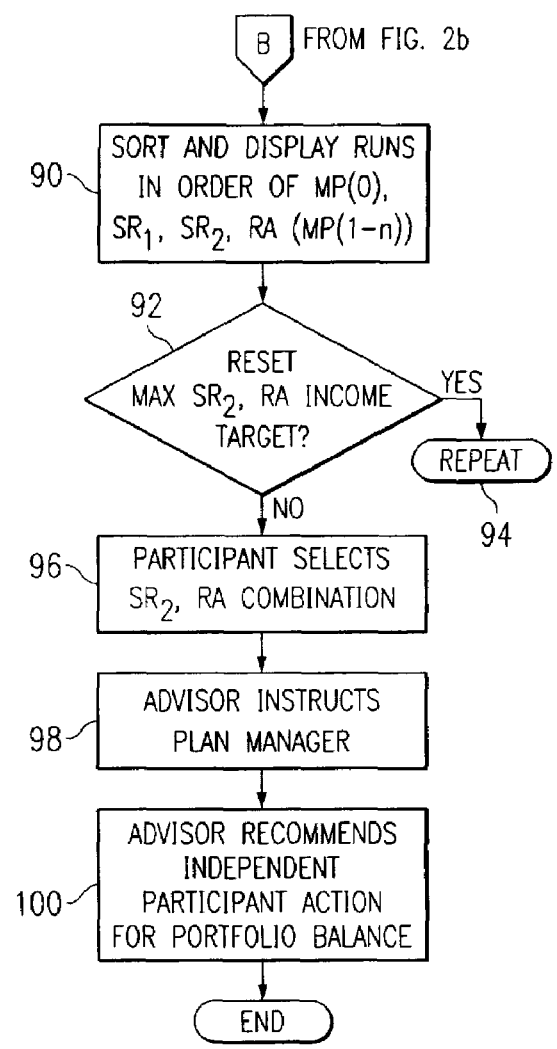

Now referring to FIG. 2c, which is a continuation of FIG. 2b, the process next sorts each of the iterations run in FIG. 2b in order of the starting model portfolio MP(0), and then the newly generated portfolios (MP(i)–MP(n)), in order of increasing $SR_1$, increasing $SR_2$, and increasing RA. These results are displayed to the participant. At step 92, the participant or investor is given the opportunity to reset maximum $SR_2$ and/or RA, and if she does so more iterations are calculated and displayed at step 94. If no further adjustments are desired, then at step 96 the participant is next ready to select that combination of $SR_2$ and RA that best meets her needs.

At step 98, the automated financial advisor 14 (FIG. 1) takes the assumptions decided upon by the participant at step 96 (or, if the participant neglects to make these choices or to perform the interview at all, default assumptions) and instructs the portfolio manager 12 to make investments according to the investment allocation best suited to the participant. In conjunction with this at step 100 the financial advisor 14 recommends to the participant an optimum asset distribution of that component of the participant's financial wealth which is not under the control of the financial advisor/ portfolio manager. This terminates the initial interview process.

FIG. 2b-1 illustrates a variant by which a sheath of model portfolios MP(0)–MP(n) may alternatively be calculated. At step 70a, as before, a beginning model portfolio MP(0) is calculated, together with a probable retirement income, for current tax-deductible savings rate $SR_1$, taxable savings rate $SR_2$, and current assumed retirement age RA. At step 72a, the routine asks whether the income goal of the investor has been achieved. If not, at step 74a the routine asks whether the retirement age is already set at a predetermined maximum period. If the retirement age is not yet maximized, at step 76a the retirement age is incremented by e.g. one year. Human Capital (HC), probable achievable income and a further model portfolio are then calculated at step 76a and the routine returns to step 72a. The loop of steps 72a, 74a and 76a will produce a set of model portfolios MP(1)–MP(n) in which the retirement age RA is incremented, until the retirement age reaches a maximum or the income goal of the investor is achieved.

Assuming that the income goal of the investor has not yet been met. the procedure next asks whether the tax-deductible savings rate $SR_1$ is already at a maximum at step 78a. If not, the tax deductible savings rate $SR_1$ is incremented, the human capital recalculated, a new model portfolio MP(n) is derived, and a new probable achievable income is found. Procedure loop 78a, 80a, 82a continues, generating further model portfolios, until the tax-deductible savings rate $SR_1$ become a predetermined maximum or until the stated income goal of the investor is achieved.

If RA and $SR_1$ are maximized but the income goal of the investor is still not achieved, the procedure will enter a loop 84a, 86a, 88a. A final set of model portfolios is created in this loop until such time as $SR_2$, the taxable savings rate reaches a maximum or until the income goal of the investor is achieved, whichever happens first. The procedure then continues as per the first illustrated embodiment (FIGS. 2a–2c).

In a further embodiment, a least "painful" solution is found by increasing savings rate and retirement age together rather than maximizing one of these three elements at a time.

Figure 3:
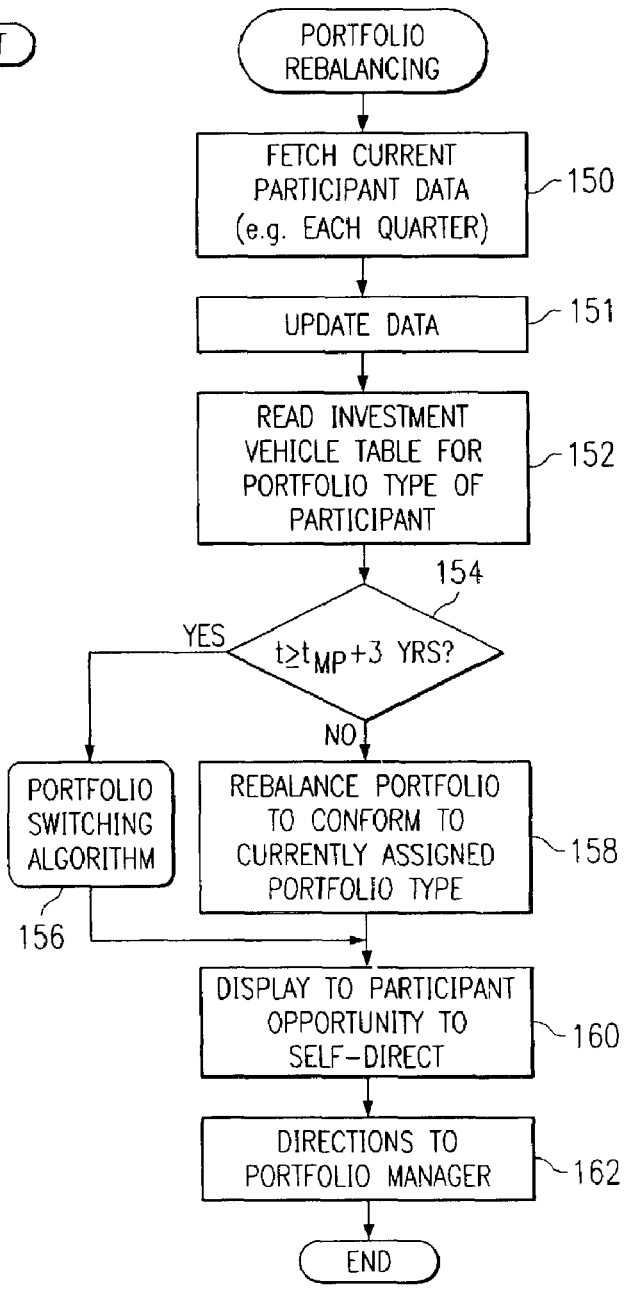
FIG. 3 is a flow diagram showing a general portfolio reallocation process according to the invention.

An important aspect of the invention is illustrated in process flowcharts of FIGS. 3 and 4, by which the assets of each participant portfolio are periodically reinspected and, unless prohibited to do so by the participant, reallocated. This reallocation of assets may be made by a system which also recommends beginning model portfolios and savings rates to a participant or investor, or it may be carried out irrespective of how the portfolio presented to it was originated.

In the reallocation process, at step 150, and at a first predetermined interval such as each quarter, the participant portfolio data are fetched by automated financial advisor 14. These data, which include the market performance of the participant's assets among other things, are updated at step 151. At step 152 the advisor 14 reads the investment vehicle table 25, which is indexed by portfolio participant type, to see what investment vehicles should now be used. One or more investment vehicles in the table may have been replaced, and if so a set of initial investment instructions to the plan manager 12 is formulated. Then, at step 154, the process asks whether it has been at least three years (or any other predetermined interval) since a portfolio type has last been attributed to the investor. If so, then at step 156 a portfolio switching algorithm is called, which is illustrated in more detail in FIG. 4. If not, at step 158 the portfolio is rebalanced, among currently acceptable investment vehicles, to conform to the currently assigned participant portfolio type. Preferably, the recommendations of the automated independent financial advisor 14 are displayed to the participant at step 160, and at this point the participant can decide to change any of these recommendations. If after a predetermined period of time the investor or participant makes no changes, the recommended investment allocations become final. Once finalized, directions to the portfolio or plan manager 12 are transmitted at step 162.

According to a preferred embodiment of the invention, the participant is initially assigned to one of a predetermined number portfolio types. For example, there may be seven such portfolio types, differing from each other in the degree of risk thought acceptable given the participant's proximity to retirement age and other factors. Portfolio switching algorithm 156 (FIG. 4) reassesses the suitability of the assigned portfolio type given the participant's advancing age and possibly changed economic circumstances, and shifts the participant to an adjacent (typically, more conservative) portfolio type if the current one is found not to fit as well as the new one.

At step 164, the participant's salary income I and non-taxable savings rate SR1 are updated with data from the employer's human resources department or other record-keeping entity. The participant/investor's nonallocatable financial wealth (nfw, that part not managed by the plan) is obtained from the investor or the investor's record keeper 29. Then, at step 166, the participant's human capital is recalculated. This, in turn, is used to recalculate the optimum financial portfolio mix at step 168. This step also includes an updated portfolio balance and a mapping to different asset classes.

Oftentimes, the portfolio manager and the independent financial expert are only in charge of a part of the investor's portfolio. For example, the investor may have more than one 401(K) account, but the portfolio manager manages only one of these. This problem is resolved by creating two baskets: one for reallocatable assets and one for nonreallocatable assets. The non-reallocatable assets remain fixed while the allocatable assets are adjusted.

This process is illustrated in FIG. 4a, which shows an adjustment step 168a that is substituted for the recalculation step 168 in FIG. 4. In FIG. 4a, the allocatable financial wealth $afw_1$ is retrieved at step 250. This is the financial wealth under the control of the portfolio manager 12. The allocatable financial wealth $afw_1$ will have been allocated into two or more asset classes. In this example, there are only two asset classes, equity and fixed income, but in other examples there could be more than two asset classes, such as cash, international and "large cap" equity classes.

At step 252, the nonallocatable financial wealth of the investor, $nfw_1$, is retrieved. The types of investment vehicles into which $nfw_1$ has been invested is inspected at step 254, and these assets are allocated among the same asset classes that are used to divide the allocatable financial wealth. One thereby obtains equity and fixed-income nonallocatable financial wealth components $nfw_{e1}$ and $nfw_{i1}$ At step 256, an identity is made between the financial wealth $nfw_1$ prior to reallocation of assets and the financial wealth $nfw_2$ after reallocation. Both of these are equal to the allocatable financial wealth $afw_1$ plus the nonallocatable financial wealth $nfw_1$.

The new ideal asset allocation between the asset classes is made at step 258; $fw_{e2}$ and $fw_{i2}$ are the ideal equity and fixed income asset class allocations, respectively. Then, at step 260, two more identities are assumed: the nonallocatable financial wealth in each asset class is assumed to remain the same, before and after the reallocation occurs. At step 262, the allocatable financial wealth $afw_{e2}$ is found by subtracting the nonallocatable financial wealth $nfw_{e2}$ from the total financial wealth $fw_{e2}$. However, if $afw_{e2}$ turns out to be less than zero, it is reset to zero and the fixed income component of allocatable financial wealth $afw_{i2}$ is equated to the total allocatable financial wealth $afw_2$. By this last step, the allocatable financial wealth is allocated such that the overall portfolio comes closest to the optimum asset allocation. The routine then passes by step 266 to step 274. Otherwise, path 264 is used. At step 268, a similar subtraction is made on the fixed income asset class side to derive the new income component of allocatable financial wealth $afw_{i2}$ as the difference between the nonallocatable financial wealth $nfwi_2$ and the total income financial wealth $fw_{i2}$. If the subtraction results in a value for $afw_{i2}$ that is less than zero, the program sets $afw_{i2}$ to zero and sets $afw_{e2}$ as equal to $afw_2$. The routine then proceeds by path 272 to step 274. Otherwise, the routine proceeds by path 270 to step 274. At step 274, one has obtained the new asset allocations $afw_{e2}$ and $afw_{i2}$ for the allocatable financial wealth $afw_2$ at the conclusion of the reallocation process. This routine then returns at step 276.

These asset classes are compared, at step 170, with the asset classes of the model portfolio for the portfolio type currently assigned to the participant, and to the asset classes of the model portfolio of the next adjacent model portfolio.

At step 172, the algorithm asks whether the newly calculated financial portfolio mix is closer to either of the adjacent model portfolios than it is to the current model portfolio. If it is not, the portfolio switching algorithm ends. If it is, the participant or investor is switched to the next adjacent model portfolio type at step 174. The date at which the portfolio type has been last assigned, $t_{MP}$, is reset at step 176 before this routine ends. As so constructed, the portfolio switching algorithm should have brakes on radical change: for example, the portfolio is not switched any sooner than after a predetermined interval, preferably three years, and if there is any change the switch is made only to an adjacent portfolio type.

In addition to taking in the (typically) declining value of the human capital of the investor, the above method also considers the market performance of the investor's assets when making adjustments in the portfolios. Market performance affects how much financial wealth the investor has. When financial wealth increases, the portfolio tends to become more conservative more quickly.

Figure 5:
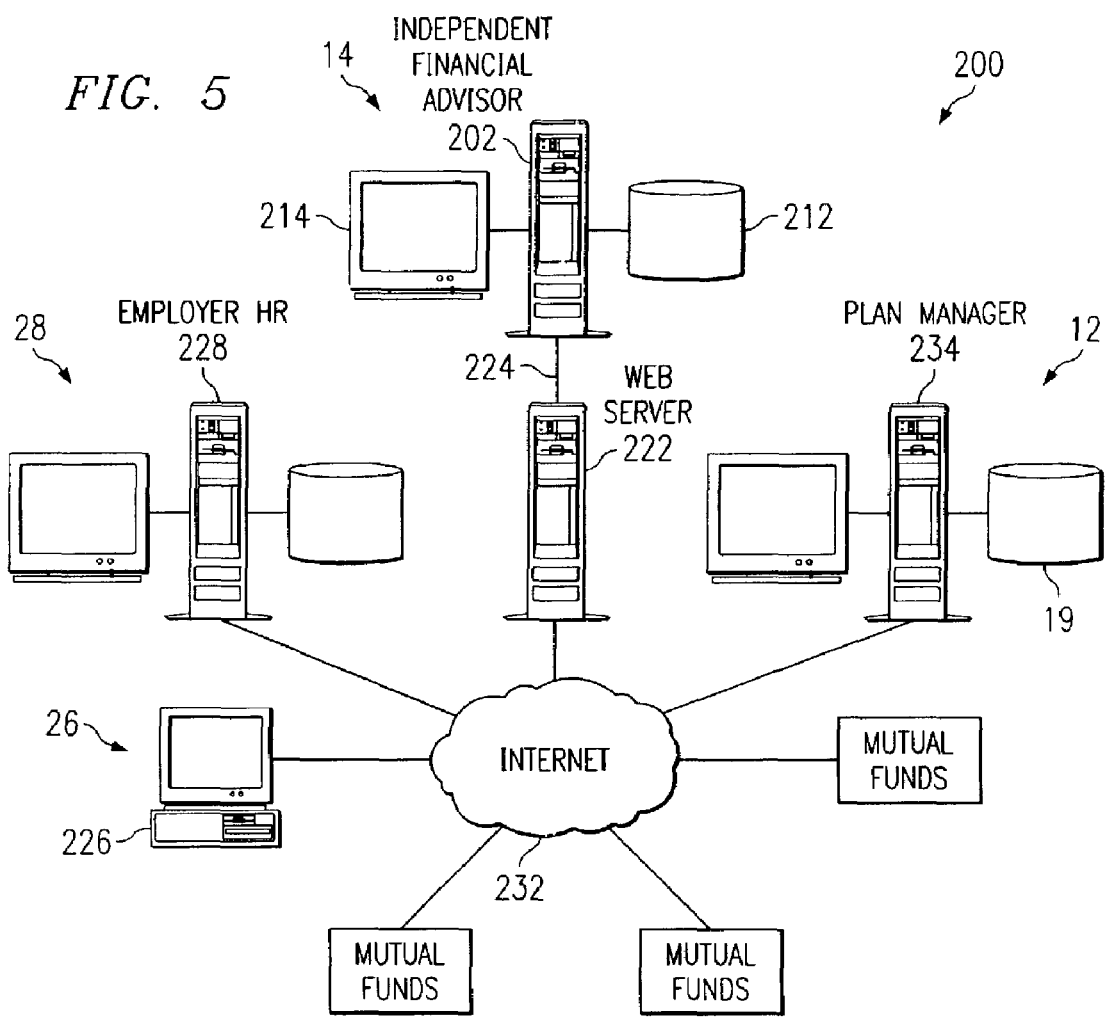
FIG. 5 is a schematic block diagram of a plan management system according to the invention.
Figure 6:
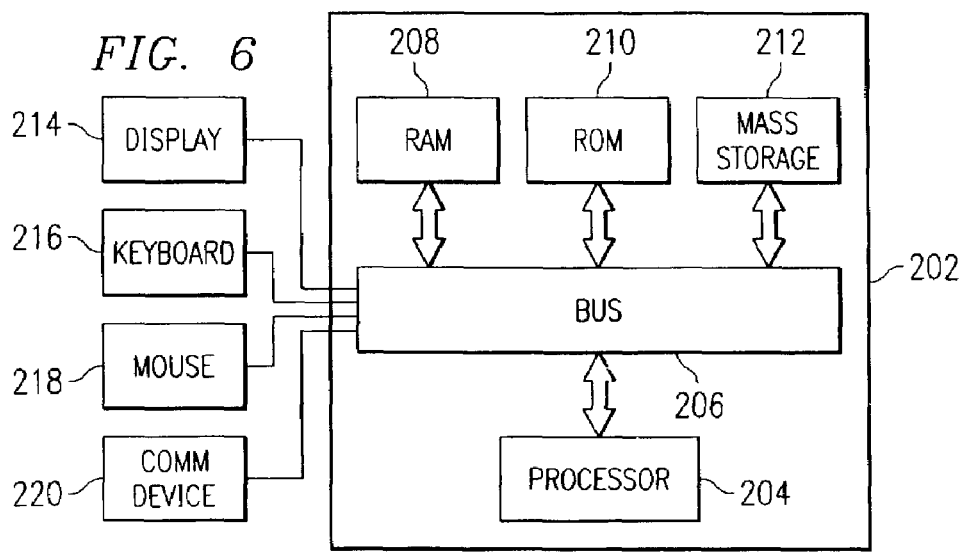
FIG. 6 is a schematic architectural block diagram illustrating a representative computer architecture suitable for carrying out the invention.

FIG. 5 is a schematic block diagram of an overall plan management system 200. The automated independent financial advisor 14 may reside on a programmed, general-purpose computer 202 having so-called personal computer ("PC") architecture; alternatively, other computers may be used, an example being a minicomputer such as those made by Sun Microsystems. Referring to FIG. 6, a highly schematic internal architecture of the computer 202 is shown. In the preferred embodiment, the computer 202's main logic is embodied by a general-purpose, programmable microprocessor 204, which in conventional practice will have an on-board memory cache (not shown) and which may be associated with one or more mathematics or other special-purpose coprocessors (not shown). The processing logic generally represented by processor 204 is connected by a bus structure 206 to the various other components of the computer 202. The schematic representation of bus 206 is shown in FIG. 6 as a simple and unitary structure, but in conventional practice, as is known to those in the art, there usually are several buses and communication pathways 206, operating at different speeds and having different purposes. Further, bus 206 may be segmented and controlled by respective bus controllers, as is also known in the art.

Computer 202 will also have a random access memory unit or units 208 connected to the bus 206. RAM 208 (which may be DRAM, SDRAM or other known types) typically has loaded into it the operating system of the computer 202 and executable instructions for one or more special applications designed to carry out the invention. Computer 202 also has electronic read-only memory 210 for storing those programs such as the BIOS which are nonvolatile and persist after the computer 202 is shut down. In alternative embodiments of the invention, one or more components of the invention's logic may be hard-wired into the ROM 210 instead of loaded as software instructions into RAM 208. ROM 210 can consist of or comprise electrically programmable read-only memory (EPROM), electrically erasable and programmable read-only memory (EEPROM) of either flash or nonflash varieties. or other sorts of read-only memory such as programmable fuse or antiffuse arrays.

In a typical architecture, a computer program suitable for carrying out the automated financial advisor component of the invention will be stored on a mass storage device 212, such as an optical disk or magnetic hard drive. A copy of the participant data used as a basis for portfolio selection will typically exist as a database on device 212, together with the investment vehicle table 25 and the asset class table 30 which are modified from time to time by personnel controlling the automated independent financial advisor 14. Bus 206 connects mass storage device 112 to RAM 108.

The computer 202 is connected to various peripheral devices used to communicate with an operator, such as display 214, keyboard 216 and mouse 218. The computer 202 also uses a communications device 220 such as a modem or a network card to communicate to other computers and equipment. The other computers herein described may have generally similar architecture but will be differently programmed to carry out their respective functions.

Returning to FIG. 5, the automated independent financial advisor server 202 can be connected to a web server 222, as by means of a hardwired connection 224 (such as an Ethernet connection) or by a wireless method (not shown). The web server acts as a host for a web site, which is the preferred interface used to perform the initial interview with each participant 26 (FIGS. 2a–2c) and which presents investment advice (portfolio allocations; FIGS. 3–4) to the participant for the participant's potential modification or even complete veto (by which he would instruct advisor 14 to leave his portfolio as-is). This web site is typically remotely accessible by a computer 226 of a participant 26.

To obtain data for certain of its calculations, as described above, the independent financial advisor computer 202, typically resident on premises distinct from those of the employer, will communicate via the Internet or the like with a database server 228 of the employer's human resources department. When the advice is finalized the advisor system 202 will also transmit instructions via remote link 232 to portfolio manager computer 234, which makes electronic trades in conformance to advisor 14's instructions, stores the present status of the participant portfolios in a plan database 19, and informs advisor 14 of that status.

While the present invention has been illustrated in conjunction with the management of a qualified retirement plan, it also has application to the management of portfolios composed of nonqualified retirement savings, such as the assets of an investor outside of employer-sponsored retirement savings plans. In managing such nonqualified portfolios, information will typically not be obtained from an employer of the investor but rather from the investor himself or herself or an agent of the investor.

In summary, a novel investor portfolio asset management system has been shown and described. An automated, independent financial advisor calculates and applies a human capital component of the investor's overall worth in order to determine an optimum allocation of the financial assets of the participant among several asset classes and investment vehicles. The financial advisor relays investment instructions based on these calculations and investor input, if any, to a plan manager for execution of trades to conform the investor portfolio to the optimum allocation. Further, the independent financial advisor automatically reallocates portfolio assets to take into account the declining value of the investor's human capital over time. While preferred embodiments of the invention and their technical advantages have been described above and illustrated in the appended drawings, the invention is not limited thereto but only by the scope and spirit of the claims which follow.

We claim:

1. A method for automatically rebalancing a portfolio of an investor, comprising the steps of:
    for a first time, determining a human capital of the investor;
    dividing the human capital of the investor into at least first and second investment types according to a predetermined formula, the first and second investment types having different degrees of risk;
    determining a financial worth of the investor;
    summing the financial worth of the investor and the human capital to derive a total worth of the investor;
    determining and storing a ratio;
    making a target allocation of the total worth of the investor between the first and second investment types according to the predetermined, stored ratio;
    for the first time, recommending an allocation of the assets of the financial worth of the investor between the first and second investment types such that the asset allocation of the total worth of the investor meets or most closely approaches the target allocation;
    determining how assets in an investment portfolio of the investor ought to be allocated among predetermined investment vehicles based on the last said recommendation of allocation of assets; and
    allocating the assets among the predetermined investment vehicles based on the determining step.

2. The method of claim 1 and further comprising the steps of:
    for a second time following the first time, recalculating the human capital of the investor;
    for the second time, recommending an allocation of the assets of the financial worth of the investor between the first and second investment types such that the asset allocation of the total worth of the investor most closely approaches the stored ratio; and
    for the second time, using the last said recommendation of allocation of assets to determine bow assets in the investment portfolio of the investor ought to be allocated among predetermined investment vehicles.

3. The method of claim 1, wherein the human capital is determined as a function of the investor's age.

4. The method of claim 3, wherein the human capital is additionally determined as a function of the investor's mortality, income and savings rate.

5. A machine-readable medium on which has been prerecorded a computer program which, when executed by a processor, performs the steps of:
    for a first time, determining a human capital of an investor;
    dividing the human capital of the investor into at least first and second investment types according to a predetermined formula, the first and second investment types having different degrees of risk;
    determining a financial worth of the investor;
    summing the financial worth of the investor and the human capital to derive a total worth of the investor;
    determining and storing a ratio;
    making a target allocation of the total worth of the investor between the first and second investment types according to the predetermined, stored ratio;
    for the first time, recommending an allocation of the assets of the financial worth of the investor between the first and second investment types such that the asset allocation of the total worth of the investor meets or most closely approaches the target allocation;
    determining how assets in an investment portfolio of the investor ought to be allocated among predetermined investment vehicles based on the last said recommendation of allocation of assets; and
    allocating the assets among the predetermined investment vehicles based on the determinist step.

6. The medium of claim 5, wherein the processor further performs the steps of:
    for a second time following the first time, recalculating the human capital of the investor;
    for the second time, recommending an allocation of the assets of the financial worth of the investor between the first and second investment types such that the asset allocation of the total worth of the investor most closely approaches the stored ratio; and
    for the second time, using the last said recommendation of allocation of assets to determine how assets in the investment portfolio of the investor ought to be allocated among predetermined investment vehicles.

7. The medium of claim 5, wherein the processor determines the human capital as a function of the investor's age.

8. The medium of claim 7, wherein the processor additionally determines the human capital as a function of the investor's mortality, income and savings rate.

9. A system for automatically rebalancing a portfolio of an investor, comprising:
    a memory for storing a value for a human capital of at least one investor, a value for a financial worth of the investor, data relating to the assets composing a financial worth of the investor, a predetermined formula and a predetermined ratio;
    a processor coupled to the memory and programmed to divide the human capital of the investor into at least first and second investment types according to the predetermined stored formula, the first and second investment types having different degrees of risk;
    the processor further programmed to sum the financial worth of the investor with the human capital of the investor to derive a total worth of the investor;
    the processor further programmed to make a target allocation of the total worth of the investor between the first and second investment types according to the predetermined, stored ratio;
    the processor calculating, at a first time, a recommended allocation of the assets of the financial worth of the investor between the first and second investment types such that the asset allocation of the total worth of the investor meets or most closely approaches the target allocation; and the memory at the first time storing the recommended allocation of the assets of the financial worth of the investor for use in directing the allocation of assets in a portfolio of the investor.

10. The system of claim 9, wherein at a second time following the first time, the processor recalculates the human capital of the investor, the processor calculating a recommended allocation of assets of the financial worth of the investor between the first and second investment types such that the asset allocation of the total worth of the investor most closely approaches the ratio stored in the memory, the memory at the second time storing the recommended allocation of assets for use in directing the allocation of assets of the portfolio of the investor.

11. The system of claim 9, wherein the memory stores the age of the investor, the processor calculating the investor's human capital as a function of the investor's age.

12. The system of claim 9, wherein the memory stores the investor's mortality, income and savings rate, the processor calculating the investor's human capital as a function of the investor's mortality, income and savings rate.

* * * * *